United States Patent [19]

Wacinski

[11] Patent Number: 5,509,861
[45] Date of Patent: Apr. 23, 1996

[54] ECCENTRIC MOTION TRANSMITTING DEVICE WITH PINS GYRATING WITHIN RESPECTIVE STATIONARY CIRCULAR OPENINGS

[75] Inventor: Andrzey B. Wacinski, Massongex, Switzerland

[73] Assignees: Plumettaz SA, Bex; Unipat AG, Glarus, both of Switzerland

[21] Appl. No.: 256,555

[22] PCT Filed: Jan. 14, 1993

[86] PCT No.: PCT/GB93/00078

§ 371 Date: Sep. 14, 1994

§ 102(e) Date: Sep. 14, 1994

[87] PCT Pub. No.: WO93/14332

PCT Pub. Date: Jul. 22, 1993

[30] Foreign Application Priority Data

Jan. 18, 1992 [GB] United Kingdom ............... 9201112

[51] Int. Cl.[6] ........................................... F16H 1/32
[52] U.S. Cl. ...................... 475/162; 475/178; 475/168
[58] Field of Search ........................... 475/162, 163, 475/168, 176, 178, 179

[56] References Cited

U.S. PATENT DOCUMENTS

| | | | |
|---|---|---|---|
| 4,117,746 | 10/1978 | Pierrat | 475/168 |
| 4,526,064 | 7/1985 | Carden et al. | 475/178 X |
| 4,621,543 | 11/1986 | Gabilondo | 475/178 X |

FOREIGN PATENT DOCUMENTS

| | | |
|---|---|---|
| 0211687 | 2/1987 | European Pat. Off. . |
| 512604 | 11/1930 | Germany . |

Primary Examiner—Khoi Q. Ta
Attorney, Agent, or Firm—Young & Thompson

[57] ABSTRACT

A motion transmitting device comprising input and output drive shafts. An eccentric is provided on the input drive shaft and supports a carrier in which an array of pins are disposed. The pins are extended from one end face of the carrier for intermittent engagement with respective "open mouthed" openings provided in a reaction plate fixed to the housing of the device in order to define the gyratory motion of the carrier. The output shaft is provided with a geared member, and where between adjacent teeth on the geared member, a profile of part semi-circular shape is provided which become sequentially and intermittently engaged by all the pins during one complete rotation of the output shaft, and where the number of teeth is one less than the number of pins.

11 Claims, 1 Drawing Sheet

ECCENTRIC MOTION TRANSMITTING DEVICE WITH PINS GYRATING WITHIN RESPECTIVE STATIONARY CIRCULAR OPENINGS

This invention is directed at an improved form of mechanical speed reducer comprising an array of pins located in a gyrating carrier body that engage and disengage intermittently with a geared member to provide large ratio speed reduction at high operating efficiency.

From one aspect the invention consists in a motion transmitting device including a housing structure comprising gear means attached to an output shaft; a carrier rotatably supported on an input shaft driven eccentric, the carrier having a generally circular array of longitudinal pins mounted thereon such that the pins project from the carrier for intermittent engagement with the gear means; and a reaction plate fixed to the housing structure of the device and having a plurality of "open mouthed" openings for intermittent engagement with the pins; and where the reaction plate and the carrier being constructed and disposed relative to each other such that relative gyratory movement transverse to the pin axes causes the pins and gear means to engage and disengage to cause relative rotation of the gear means.

Thus the device may include an input shaft and eccentric on which a carrier element is located. The carrier may be provided with a single circular array of holes into which respective pins are fixed or journalled such that the longitudinal axes of the pins remain fixed relative to the carrier.

Each pin may protrude from its hole on one side of the carrier, and may be fitted with a suitable plain roller bearing if required.

A reaction plate is provided in which an array of "open mouthed" openings are located, the number of openings being equal to the number of pins. The size of the openings may be equal to the sum of the pin diameter and twice the eccentricity of the eccentric member, but this form may be varied to allow for relief from radial loads. Thereby, each pin is only in contact intermittently with its respective "open mouthed" opening during the operational cycle, and where at other times, it is completely disengaged with its respective opening.

The shape of the openings is preferably such to allow the protruding end of the pin to move in an circular orbit about the opening, thereby driving over an arc of 180 degrees at most and causing the gyratory motion of the carrier during rotation of the eccentric.

In order to transfer the motion from the gyrating carrier to an output, a geared member is provided on the output shaft of the device. The geared member is provided with teeth on its circumference and where the number of teeth are one less in number than there are pins in the carrier. Between adjacent teeth, a profile of partial semi-circular shape maybe provided, and the pins operate against these profiles for the transmission of power from the gyrating carrier to the geared member.

The axes of the pins is fixed with respect to the carrier, and where the reaction plate and carrier are disposed relative to each other such that relative gyratory movement of the carrier transverse to the pin axes causes the pins to engage and disengage with the reaction plate such as to cause relative rotation of the geared member on the output shaft. This occurs because of the gyratory motion of the carrier causes the pins to become sequentially engaged to the profiles provided between the teeth on the geared member. By just considering a single pin during one full rotation of the input shaft, the pin becomes engaged with a profile and acts to index or displace the geared member by an amount equal to one tooth spacing. As however in practice there are several pins engaged with the geared member at any one time, the force required to displace the geared member is shared by several pins.

While a proportion of the pins become disengaged from the geared member, they start to gradually commence engagement with their respective openings in the reaction plate. In contrast, those pins positioned approximately 180 degrees to the other side of the carrier, become disengaged from the reaction plate and commence gradual engagement with the geared member.

Preferably the device uses 15 or more pins in order to reduce surface pressures in the interaction between the pins and the reaction plate and geared member, while also keeping more than one pin engaged at any one time for improved load sharing.

The device requires that there are an equal number of openings as there are pins provided in the reaction plate, whereas one less tooth than the number of pins is provided in the geared member.

As a result, the geometry of the device provides it with the capacity for high ratio speed reduction in a single step of ratio:

$$\frac{N}{n-N}$$

where "N" is the number of engagement means (e. g. teeth) in the geared element, and "n" is the number of pins in the carrier.

For many applications, the gyrating internal mass of the device may be balanced by the removal of a small amount of material from the eccentric, thus removing the need for a separate balance weight in the device.

It has been found that by positioning a bearing between the housing and the gear, the line of action of the forces generated within the mechanism intersect the eccentric bearing of the device, thus providing enhanced stability and operating life of the device.

This invention has particular economic merit as a number of internal components can be manufactured in powder-metal or plastic due to in part, improved bearing support for the carrier member. Further, a substantial improvement in durability and operating efficiency is thereby obtained.

The invention will now be described with reference to the accompanying drawings.

Figure 1:
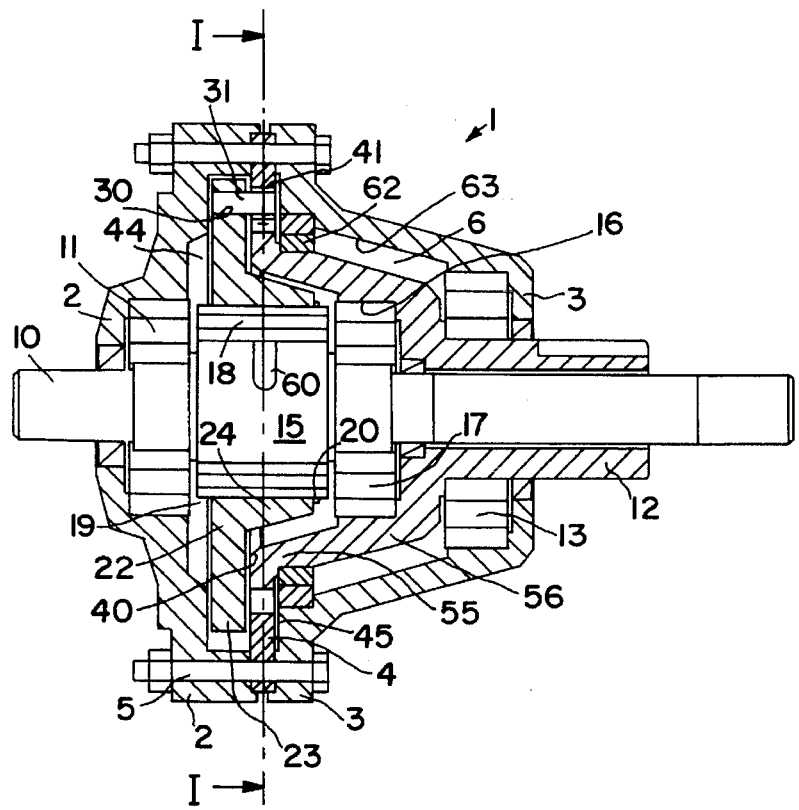
FIG. 1 is a longitudinal section through a motion transmitting device according to the invention.
Figure 2:
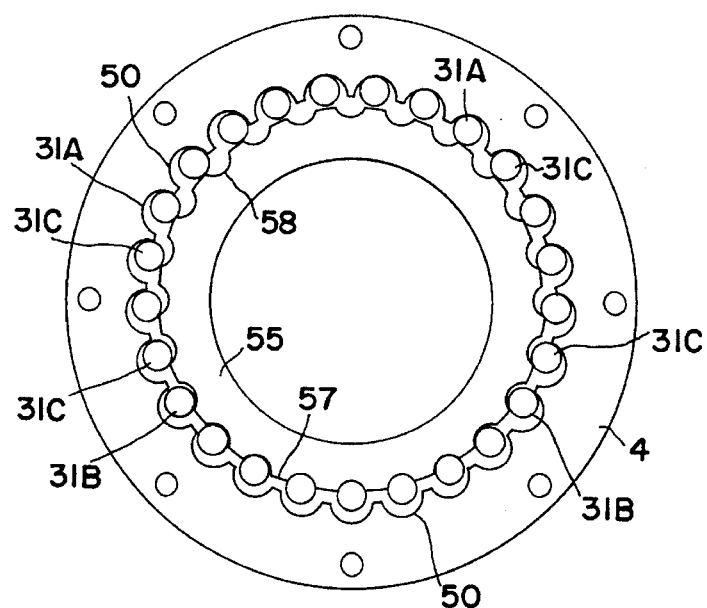
FIG. 2 is an end view through section I—I of FIG. 1 showing relative positions of the pins with respect to both the profiles provided between teeth of the geared member and openings provided in the reaction plate.

A motion transmitting device as shown in FIGS. 1 and 2 and identified by reference number 1 includes housing elements 2, 3. A central plate called the reaction plate 4 is held between housing elements by bolts 5 such that an internal chamber 6 is formed.

An input drive shaft 10 (always the low-torque shaft) supported in housing element 2 by bearing 11, and an output drive shaft 12 (always the high-torque shaft) supported in housing element 3 by bearing 13 such that the shafts 10, 12 are coaxial.

Input drive shaft 10 is provided with an eccentric portion 15 and is extended into pocket 16 in the output drive shaft 12 for support by bearing 17.

Bearing 18 is positioned on the eccentric portion 15 and retained in place by circlips 19, 20 so that carrier 22 is supported for free rotation about eccentric portion 15.

Carrier 22 comprises a circular disc 23 with integral collar 24 to increase its axial length over the eccentric portion 15. A plurality of equally spaced holes 30 are provided in the carrier 22, each hole 30 receives and supports a pin 31 such that the longitudinal axes of all pins 31 remain fixed relative to the carrier 22.

Although pins 31 may be fitted to be either freely rotatable in holes 30, or fixed in holes 30, it is preferable that pins 31 are fixed in their respective holes 30.

The pins 31 extend through one end face 40 of the carrier 22 to protrude for a limited distance. If required, a plain roller bearing 41 (only shown in FIG. 1) may be fitted to the protruding end of pins 31, and to ensure that pins 31 remain in correct axial position in holes 30, thrust washer 44 is provided on the left end face of carrier 22 whereas thrust washer 45 is provided between the ends of pins 31 and housing element 3.

Reaction plate 4 is provided with a number of "open mouthed" openings 50 as shown in FIG. 2; the number of openings 50 equalling the number of pins 31 in the device 1. Openings 50 project inwards into internal chamber 6 of the device 1 and where at any one time, a proportion of these openings 50 are engaged by their respective pins 31. The result of this engagement between the pins 31 and openings 50 in the reaction plate 4 is that the motion for the carrier 22 is forced to be gyratory. That is, the respective dimensions of pins 31 and openings 50 are such that each pin 31 always engages the same opening 50.

A geared member 55 is formed to or attached to the flanged end 56 of the output shaft 12, and the pitch circle of geared member 55 is arranged to be concentric with the rotating axes of both drive shafts 10, 12 of the device 1.

Teeth 57 are positioned on the circumference on geared member 55, the teeth 57 project outwardly into internal chamber 6. Between adjacent teeth 57, a profile 58 of part semi-circular shape is provided, and a proportion of all the profiles 58 are engaged by pins 31 at all times during the working cycle of the device 1. During one complete gyration of the carrier 22, the output shaft 12 is indexed by an amount equal to one tooth space as there is at least one less in the number of teeth 57 as there are pins 31 in the device 1.

A hole or slot 60 machined in the eccentric portion 15 in direction normal to its rotating axis reduces the off-centre mass in order that, for most applications, a separate balance weight component is no-longer required.

Bearing 62 is disposed between the interior housing wall 63 of housing element 3 and the teeth 57 of geared member 55, and thereby provides improved rigidity for the moving elements of the device 1, as the line of action for support intersects the the eccentric bearing 18.

Rotation of the input shaft 10 and integral eccentric portion 15 causes gyratory motion of carrier 22 as a proportion of the pins 31 are engaged with their respective "open mouthed" openings 50 in the fixed reaction plate 4.

At the same time, other pins 31 in the device 1 become sequentially engaged to the teeth 57 of the geared member 55 provided on the output shaft 12, and thereby gyratory motion of the carrier 22 and pins 31 is translated into rotary motion (at reduced speed) of the output drive shaft 12.

FIG. 2 shows the relative position of those pins 31A which are in engagement with their respective "open mouthed" openings 50 (and not in contact with profiles 58), while pins 31B are only in active contact with profiles 58 of the geared member 55. The remaining pins 31C in-between are in contact with both their respective openings 50 and the profiles 58 of the geared member 55.

It is to be understood that while we have illustrated and described one embodiment of the invention, it is not to be limited to the specific form or arrangement of parts herein described and shown except insofar as such limitations are included in the claims.

I claim:

1. A motion transmitting device including a housing structure comprising gear means attached to an output shaft; a carrier rotatably supported on an input shaft driven eccentric, the carrier having a generally circular array of longitudinal pins mounted thereon such that the pins project from the carrier for intermittent engagement with the gear means; and a reaction plate fixed to the housing structure of the device and having a plurality of open mouthed openings for intermittent engagement with the pins and where the reaction plate and the carrier being constructed and disposed relative to each other such that relative gyratory movement transverse to the pin axes causes the pins and the gear means to engage and disengage to cause relative rotation of the gear means, wherein the respective dimensions of the pins and openings are such that each pin always engages the same opening.

2. A motion transmitting device as claimed in claim 1 wherein the respective dimensions of the pins and openings are such that the pin can penetrate within a respective opening, during a part of the cycle of operation of the device, sufficiently to clear the gear means.

3. A motion transmitting device of claim 1 wherein a proportion of the pins contact with either the openings or the gear means at any one point during one full rotation of the input shaft, and where the remaining pins are in contact with both the openings and the gear means.

4. A motion transmitting device of claim 1 wherein the openings in the reaction plate act to define the gyratory motion of the carrier.

5. A motion transmitting device of claim 1 wherein the number of openings in the reaction plate equals the numbers of pins in the carrier.

6. A motion transmitting device of claim 1 wherein the number of teeth in the geared means is one less the number of pins in the carrier.

7. A motion transmitting device of claim 1 wherein the eccentric mass is reduced by the provision of a hole or slot normal to its rotating axis.

8. A motion transmitting device of claim 1 wherein bearing support is provided adjacent to the geared means such that its line of action intersects the eccentric bearing of the device.

9. A motion transmitting device of claim 1 wherein the shape of the profiles provided in the gear means is semi-circular.

10. A motion transmitting device of claim 1 wherein the shape of the openings is semi-circular.

11. A motion transmitting device of claim 1 wherein a roller element is supported on the projected portion of each pin.

* * * * *